United States Patent
Hashimoto

(10) Patent No.: US 6,879,338 B1
(45) Date of Patent: Apr. 12, 2005

(54) OUTWARD FACING CAMERA SYSTEM FOR ENVIRONMENT CAPTURE

(75) Inventor: Roy T. Hashimoto, Redwood City, CA (US)

(73) Assignee: Enroute, Inc., Fremont, CA (US)

( * ) Notice: Subject to any disclaimer, the term of this patent is extended or adjusted under 35 U.S.C. 154(b) by 0 days.

(21) Appl. No.: 09/541,393

(22) Filed: Mar. 31, 2000

(51) Int. Cl.⁷ .................................................. H04N 7/00
(52) U.S. Cl. ........................................ 348/36; 359/728
(58) Field of Search ............................... 348/36, 38–39, 348/42, 47; 382/284, 285; 359/725, 728

(56) References Cited

U.S. PATENT DOCUMENTS

| 5,023,725 A | 6/1991 | McCutchen |
| 5,703,604 A | 12/1997 | McCutchen |
| 6,118,595 A * | 9/2000 | Miller ........................ 359/725 |
| 6,141,034 A * | 10/2000 | McCutchen ................... 348/36 |
| 6,486,908 B1 * | 11/2002 | Chen et al. ................... 348/39 |

* cited by examiner

*Primary Examiner*—Gims Philippe
(74) *Attorney, Agent, or Firm*—Bever, Hoffman & Harms, LLP; Edward S. Mao

(57) ABSTRACT

Asymmetrical camera systems, which are adapted to utilize a greater proportion of the image data from each camera as compared to symmetrical camera systems, are disclosed. Specifically, an outward facing camera system in accordance with one embodiment of the present invention includes a plurality of equatorial cameras distributed evenly about an origin point in a plane. The outward facing camera system also includes a first plurality of polar cameras tilted above the plane. Furthermore, some embodiments of the present invention include a second plurality of polar cameras tilted below the plane. The equatorial cameras and polar cameras are configured to capture an complete coverage of an environment.

15 Claims, 9 Drawing Sheets

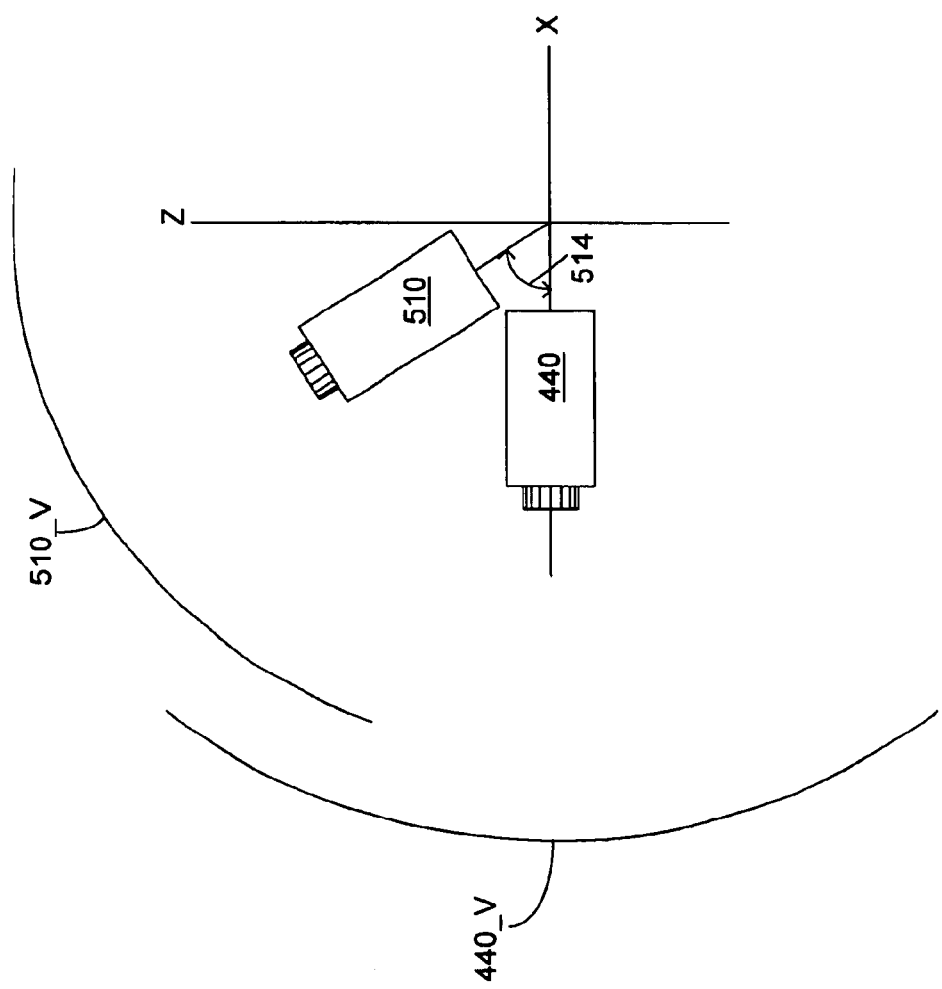

OUTWARD FACING CAMERA SYSTEM FOR ENVIRONMENT CAPTURE

CROSS-REFERENCE TO RELATED APPLICATIONS

This application relates to co-pending application Ser. No. 09/505,337, entitled "POLYGONAL CURVATURE MAPPING TO INCREASE TEXTURE EFFICIENCY", by Hashimoto, et. al., filed Feb. 16, 2000, owned by the assignee of this application and incorporated herein by reference.

FIELD OF THE INVENTION

The present invention relates image capturing. More specifically, the present invention relates to multi-camera systems configured for environment capturing.

BACKGROUND OF THE INVENTION

As the processing power of microprocessors and the quality of graphics systems have increased, environment mapping systems have become feasible on personal computer systems. Environment mapping systems use computer graphics to display the surroundings or environment of a theoretical viewer. Ideally, a user of the environment mapping system can view the environment at any angle or elevation. FIG. 1 illustrates the construct used in conventional environment mapping systems. A viewer 105 (represented by an angle with a curve across the angle) is centered at the origin of a three dimensional space having x, y, and z coordinates. The environment of viewer 105 (i.e., what the viewer can see) is ideally represented by a sphere 110, which surrounds viewer 105. Generally, for ease of calculation, sphere 110 is defined with a radius of 1 and is centered at the origin of the three dimensional space. More specifically, the environment of viewer 105 is captured and then re-projected onto the inner surface of sphere 110. Viewer 105 has a view window 130 which defines the amount of sphere 110 viewer 105 can see at any given moment. View window 130 is typically displayed on a display unit for the user of the environment mapping system.

Conventional environment mapping systems include an environment capture system and an environment display system. The environment capture system creates an environment map which contains the necessary data to recreate the environment of viewer 105. The environment display system displays portions of the environment in view window 130 based on the field of view of the user of the environment display system. An environment display system is described in detail by Hashimoto et al., in co-pending U.S. patent application Ser. No. 09/505,337, entitled "POLYGONAL CURVATURE MAPPING TO INCREASE TEXTURE EFFICIENCY." Typically, the environment capture system includes a camera system to capture the entire environment of viewer 105. Specifically, the field of view of the camera system must encompass the totality of the inner surface of sphere 110.

An extension to environment mapping is generating and displaying immersive videos. Immersive videos involves creating multiple environment maps, ideally at a rate of 30 frames a second, and displaying appropriate sections of the multiple environment maps for viewer 105, also ideally at a rate of 30 frames a second. Immersive videos are used to provide a dynamic environment rather than a single static environment as provided by a single environment map. Alternatively, immersive video techniques allow the location of viewer 105 to be moved. For example, an immersive video can be made to capture a flight in the Grand Canyon. The user of an immersive video display system would be able to take the flight and look out at the Grand Canyon at any angle. Camera systems for environment mappings can be easily converted for use with immersive videos by using video cameras in place of still image cameras.

Many conventional camera systems exist to capture the entire environment of viewer 105. For example, cameras can be adapted to use hemispherical lens to capture a hemisphere of sphere 110, i.e. half of the environment of viewer 105. By using two camera with hemispherical lens the entire environment of viewer 105 can be captured. However, the images captured by a camera with a hemispherical lens require intensive processing to remove the distortions caused by the hemispherical lens. Furthermore, two cameras provides very limited resolution for capturing the environment of viewer 105. Thus, environment mapping using images captured with cameras using hemispherical lenses can only produce low resolution displays while still requiring intensive processing.

Other camera systems use multiple outward facing cameras based on the five regular polyhedrons, also known as the platonic solids. Specifically, each cameras of the camera system point radially outward from a common point, e.g. the origin of the three dimensional space, towards the center of a face of the regular polyhedron. For example, as illustrated in FIG. 2, conceptually, a cube 220 (also called a hexahedron) surrounds sphere 110. As illustrated in FIG. 2(b) camera system 250 includes cameras 251, 252, 253, 254, 255, and 256. Camera 256, which is obstructed by camera 251 is not shown. FIG. 2(b) is drawn from the perspective of looking down on the camera system from the Z axis with the positive Z axis coming out of the page. Each cameras faces outward from the origin and point towards the center of a face of the cube. Thus, cameras 251 and 256 are on the Z-axis and face out of the page and into the page, respectively. Similarly, cameras 252 and 254 are on the Y axis and points up and down on the page respectively. Cameras 253 and 255 are on the X axis and point to the right and to the left of the page, respectively. Similar approaches can be used for each of the 4 other regular polyhedrons (i.e., tetrahedrons, octahedrons, dodecahedrons, and icosahedrons).

However, camera systems based on regular polyhedrons have poor utilization of the image data provided by standard cameras. Specifically, as illustrated in FIG. 3(a), standard cameras provide a rectangular image 310 having a long side 315 and a short side 317. The ratio of width to the height of an image is defined as an aspect ration. Thus, the length of long side 315 and short side 317 is called the aspect ratio of rectangular image 310. Typical aspect ratios include 4:3 (1.33) and 16:9 (1.78). Regular polyhedron have faces formed by triangles, squares, or pentagons. The short side of rectangular image 310 must encompass the face of the polyhedron. Therefore, as shown in FIGS. 3(b)–3(d) most of the image data captured by conventional cameras are not used by an environment capture system. Specifically, FIG. 3(b) shows a square face 320 of a hexahedron within rectangular image 320. Similarly, FIG. 3(c) shows a triangular face of a tetrahedron, octahedron, or icosahedron within rectangular image 310 and FIG. 3(d) shows a pentagonal face of an dodecahedron within rectangular image 310. Typically, the short side of rectangular image 310 is slightly larger than the polyhedral face to allow some overlap between the various cameras of the camera system. The overlap allows for minor alignment problems which may exist in the camera system. An environment capture system would only use the data within the faces of the polyhedron while the rest of rectangular image 310 is not used. Thus, only a small portion of the image data captured by each camera is utilized to generate the environment map. Consequently, even the use of multiple cameras arranged using regular polyhedrons may not provide enough resolution for quality environment mapping systems. Hence, there is a need for an efficient camera system for use with environment mapping and immersive videos.

SUMMARY OF THE INVENTION

Accordingly, the present invention provides an efficient camera system that utilizes the asymmetry of conventional camera to efficiently capture environments. In one embodiment of the present invention, an outward facing camera system includes a plurality of equatorial cameras. The equatorial cameras face radially outward from an origin and are located in or near a plane. Generally, the equatorial cameras are distributed evenly about the origin so that each equatorial camera is offset from an adjacent camera by the same equatorial adjacent angle. The outward facing camera system also includes a plurality of polar cameras tilted above the plane. Generally, the polar cameras also face radially outward from the origin and are all tilted by the same equatorial offset angle. However, some embodiments may include polar cameras having different equatorial offset angles.

The equatorial offset angle is chosen to insure complete camera coverage of an environment. Therefore, the equatorial offset angle is chosen to eliminate gaps between the fields of view of the polar cameras and the equatorial cameras. Thus, the equatorial offset angle is generally selected to cause some overlap between the field of view of the polar cameras and the equatorial cameras. The outward facing camera system can also include one or more polar cameras tilted below the plane. The present invention will be more fully understood in view of the following description and drawings.

BRIEF DESCRIPTION OF THE DRAWINGS

FIG. 5(b) is a diagram of part of an asymmetrical camera system illustrating overlapping fields of view.

DETAILED DESCRIPTION

As explained above, camera systems for environment mapping should have a spherical field of view to capture the entire environment around a viewer. Symmetrical camera systems based on regular polyhedrons are inefficient because conventional cameras typically produce rectangular images. Thus, much of the image data captured by the cameras of symmetrical camera systems are not used by the environment mapping system.

Figure 1:
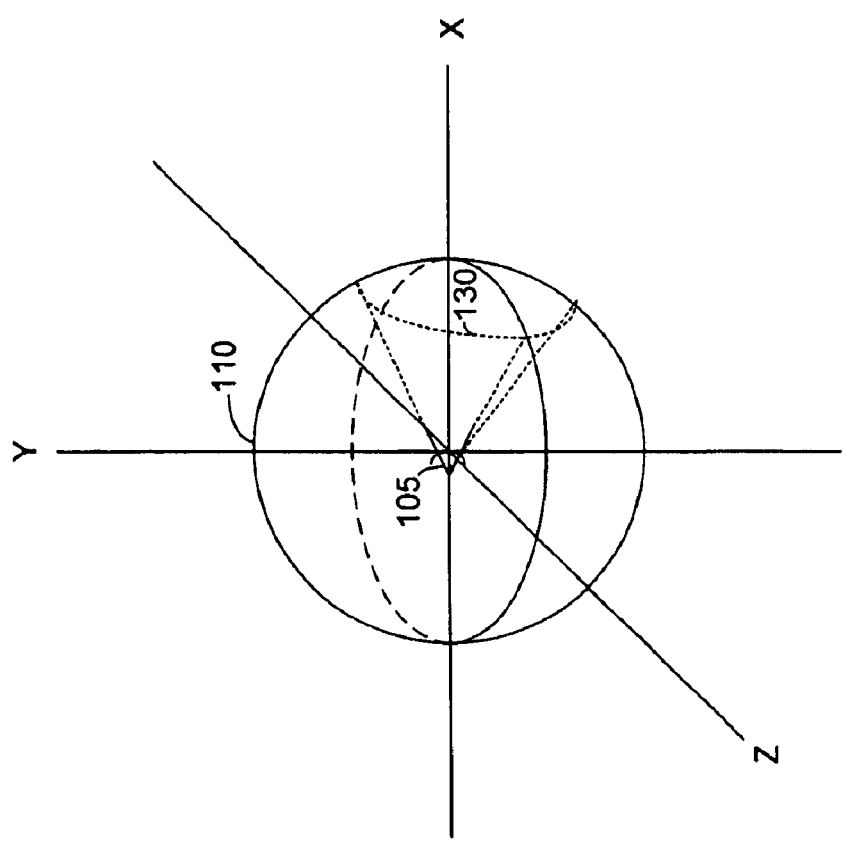
FIG. 1 is a three-dimensional representation of a user and an environment.
Figure 2A:
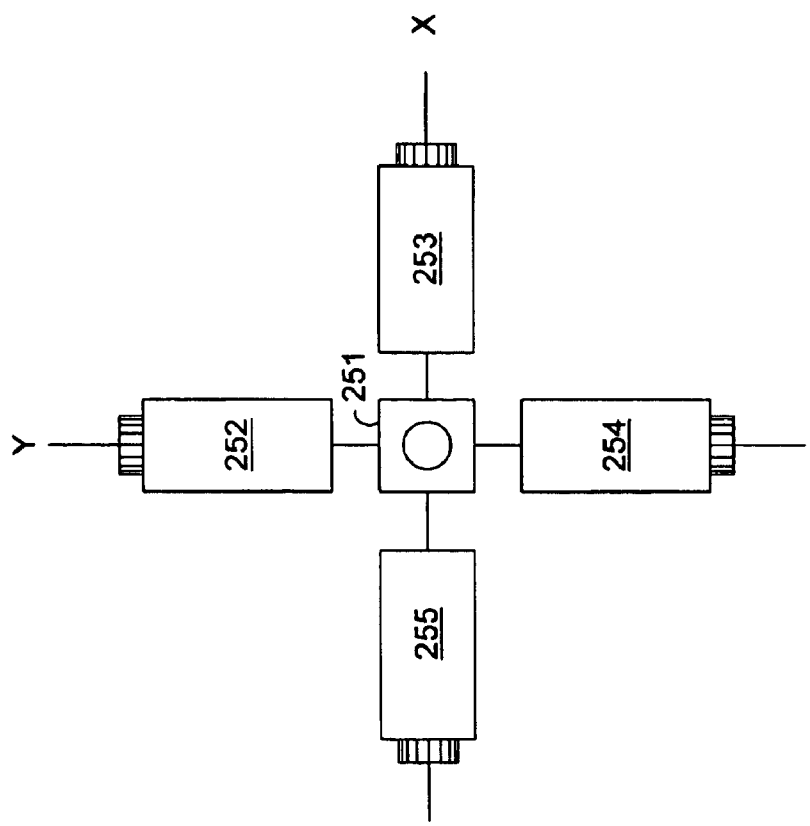
FIG. 2(a) is a three-dimensional representation of an environment surrounded by a cube.
Figure 2B:
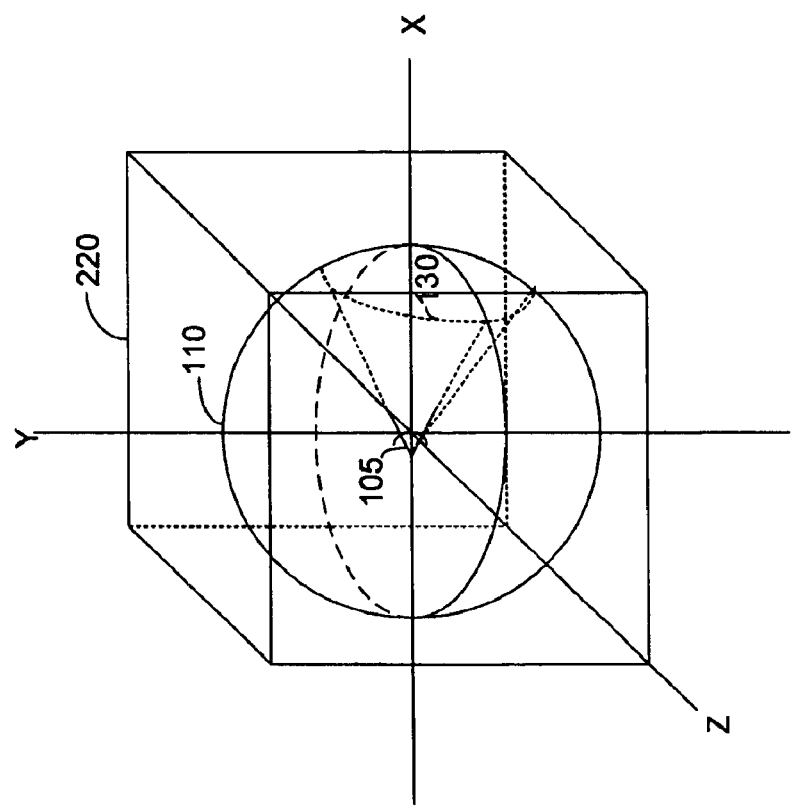
FIG. 2(b) is a three-dimensional diagram of a conventional camera system based on a cube.
Figure 3A:
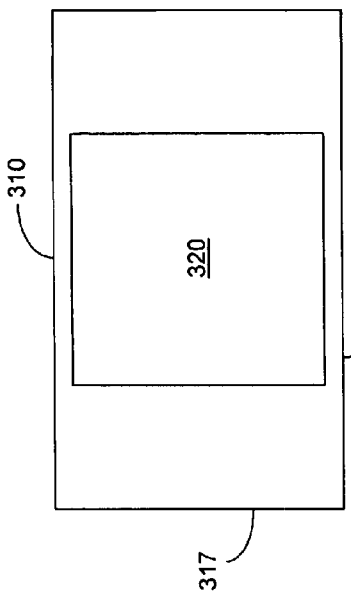
FIGS. 3(a)–3(d) illustrates inefficiencies of polyhedron faces and rectangular image capture.
Figure 3B:
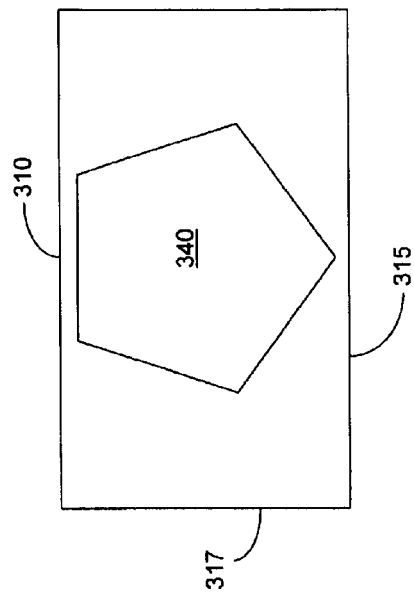
Figure 3C:
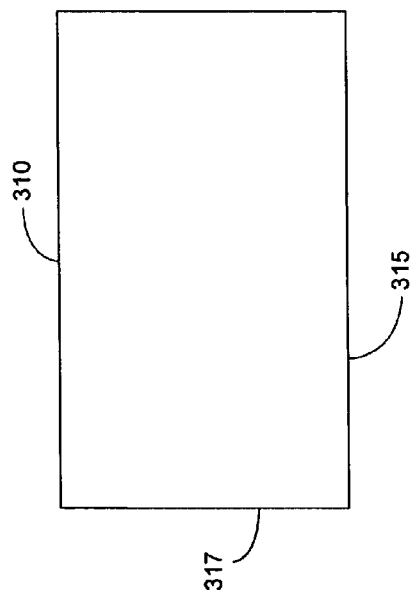
Figure 3D:
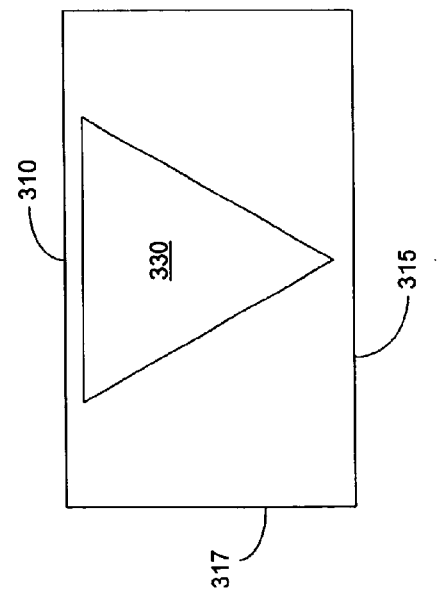
Figure 4:
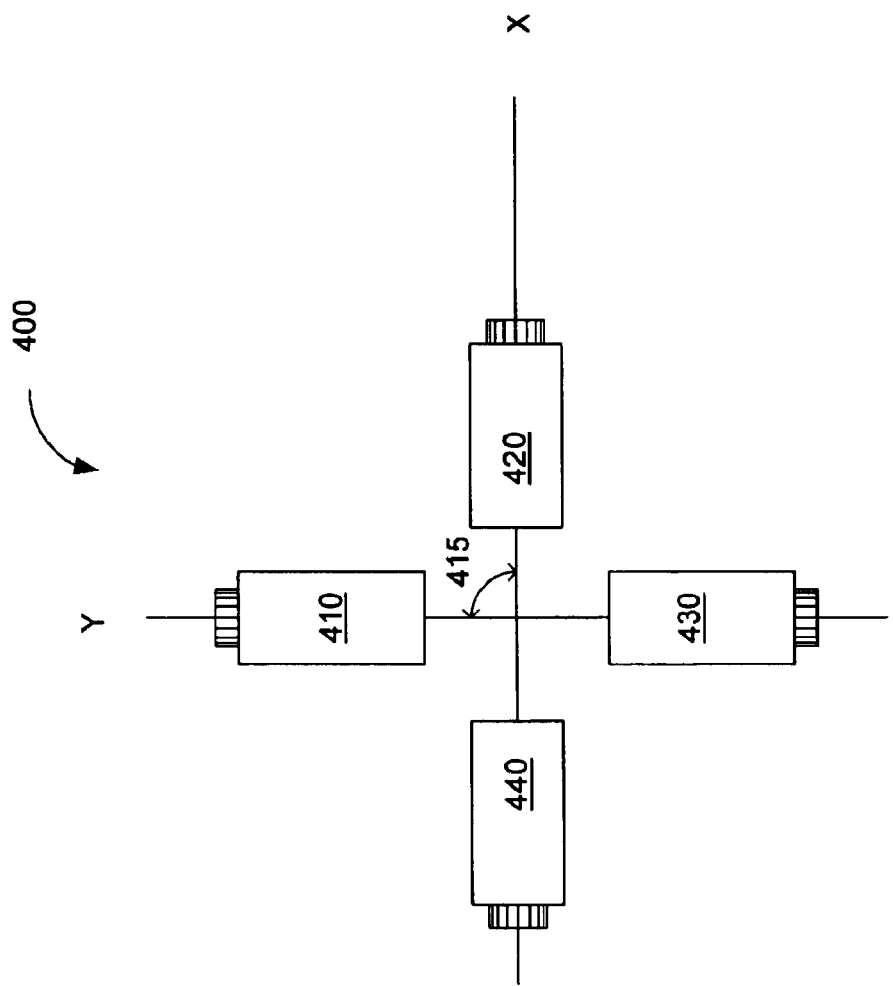
FIG. 4 is a three-dimensional diagram of part of an asymmetrical camera system in accordance with one embodiment of the present invention.
Figure 5A:
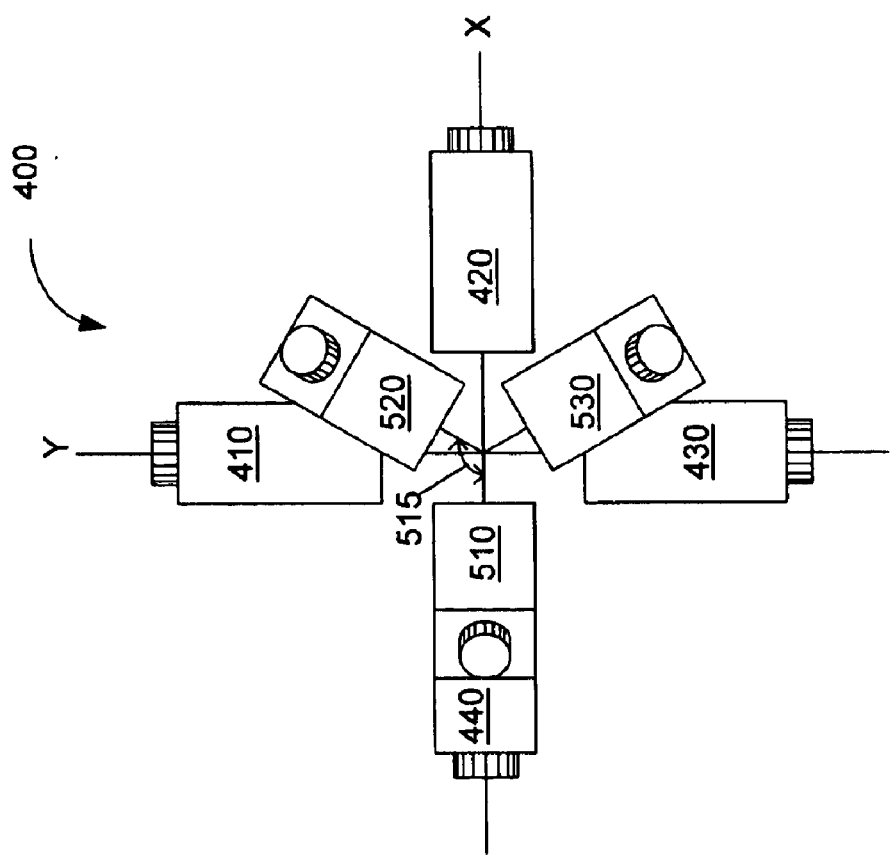
FIG. 5(a) is a three-dimensional diagram of an asymmetrical camera system in accordance with one embodiment of the present invention.

In accordance with the present invention, asymmetrical camera systems are adapted to utilize a greater proportion of the image data from each camera as compared to symmetrical camera systems, which are based on regular polyhedrons. FIGS. 4, 5(a), and 6 show various parts of a camera system 400 in accordance with one embodiment of the present invention. Camera system 400 includes a plurality of equatorial cameras 410, 420, 430, and 440. In camera system 400, four equatorial cameras are used. However, other embodiment of the present invention may use a different number of equatorial cameras. As used herein, equatorial cameras refer to a set of cameras in or near an equator of sphere 110. For convenience and clarity, equatorial cameras are described as being in or near the XY plane.

The plurality of equatorial cameras face radially outward from the origin and should be distributed evenly about the origin. Each equatorial camera is offset from an adjacent camera by an equatorial adjacent angle. For example, as shown in FIG. 4, camera 410 and camera 420 are offset by equatorial adjacent angle 415. As used herein, a first camera is adjacent to a second camera, if the field of view of the first camera overlaps the field of view of the second camera. Generally, the equatorial adjacent angle should equal 360 degrees divided by the number of equatorial cameras. Thus, when the plurality of equatorial cameras includes 4 cameras, the equatorial adjacent angle is 90 degrees. For clarity, equatorial cameras 410, 420, 430, and 440 are shown to be on the X and Y axes of FIG. 4. Specifically, camera 410 is located on the positive Y axis pointing in the positive Y direction, camera 420 is on the positive X axis pointing in the positive X direction, camera 430 is on the negative Y axis pointing in the negative Y direction, and equatorial camera 440 is on the negative X axis pointing in the negative X direction.

The number of equatorial cameras in a camera system is dictated by the field of view of the cameras used in the camera system. A camera C has a rectangular field of view, for convenience the dimension of the field of view are called a horizontal field of view C_H and a vertical field of view C_V. The full rectangular field of view is labeled with reference name C_F. Horizontal field of view C_H is defined with respect to the XY plane. Vertical field of view is defined with respect to ZX plane or the ZY plane. In general, the horizontal field of view of each equatorial camera should be greater than 360 divided by the number of equatorial cameras. For example, a specific embodiment of camera system 400 a camera system includes four equatorial cameras each with a horizontal field of view of approximately 104 degrees and a vertical field of view of approximately 76 degrees. As used herein, field of view is generally defined with respect to the origin. However, when giving specific fields of view for cameras, the field of view is with respect to the camera lens. By allowing overlap of the fields of view this slight discrepancy is inconsequential and can be ignored.

Some embodiments of the present invention may tilt the equatorial cameras slightly out of the XY plane. Thus the equatorial cameras may have an equatorial tilt angle. For embodiments where the equatorial cameras are in the XY plane, the equatorial tilt angle is equal to zero.

As illustrated in FIG. 5(a), camera system 400 includes a first plurality of polar cameras. Specifically, camera system 400 includes polar cameras 510, 520 and 530 in the first plurality of polar cameras. As used herein, a polar camera is a camera that is tilted above or tilted below the plurality of equatorial cameras. FIG. 5(a) is drawn from the perspective of looking down the Z axis with the positive Z axis coming out of the page. Each polar camera faces radially outward and is tilted out of the XY plane by a equatorial offset angle (see FIG. 5(b)). The equatorial offset angle is dependent on the vertical field of view the equatorial cameras and the polar camera. In camera system 400 equatorial camera 440 and polar camera 510 are along the negative X axis. However, some embodiments of the present invention do not align any of the polar cameras with an equatorial camera.

The practical maximum and minimum limit of an equatorial offset angle 514 is determined with reference to FIG. 5(b) for camera systems in which the field of view of the polar cameras and equatorial cameras are aligned with the XY plane. Furthermore, the following explanations are made based on rectangular projections of the field of view of the various equatorial and polar cameras. In actual use, the rectangular projections do not produce rectangular fields of view on sphere 110. Thus, many small inaccuracies exist in the following calculations of equatorial offset angles. However, by allowing a small but significant overlap between the fields of view, these small inaccuracies can be ignored. Actual camera projections on a sphere 110 can be generated using 3-D projection system such as Powerstitch™ by Enroute Inc.

FIG. 5(b) is drawn from the perspective of looking down the Y axis with the negative Y axis coming out of the page. Furthermore, for clarity, only equatorial camera 440 and polar camera 510, which are offset by equatorial offset angle 514, are shown in FIG. 5(b). Equatorial camera 440 has a vertical field of view 440_V. Polar camera 510 has a vertical field of view 510_V. To ensure complete coverage of the environment, vertical field of view 510_V and vertical field of view 440_V should overlap. Furthermore, vertical field of view 510_V should extend to the Z axis.

Since both the vertical and horizontal field of view of a camera is centered about the center of the camera, half of vertical field of view 440_V extend above the XY plane. Similarly half of vertical field of view 510_V extends radially from the center of polar camera 510 towards equatorial camera 440. Thus, equatorial offset angle 514 must be less then half of vertical field of view 440_V plus half of vertical field of view 510_V to insure overlap of vertical fields of view 440_V and 510_V. For embodiments of the invention having a non-zero equatorial tilt angle, the equatorial tilt angle can be added to the maximum limit of equatorial offset angle 514.

As explained above, vertical field of view 510_V should 8 extend to the Z axis to provide complete coverage of the environment. Thus, equatorial offset angle 514 must be greater than 90 degrees minus half of vertical field of view 510_V. In one embodiment of the present invention, both vertical fields of view 440_V and 510_V are equal to approximately 76 degrees. Thus, equatorial offset angle 514 has a upper limit of 76 degrees (i.e. 76/2+76/2) and a lower limit of 52 degrees (i.e. 90−76/2). In a specific embodiment of camera system 400, the equatorial offset angle is equal to approximately 56 degrees.

Each polar camera is separated from an adjacent polar camera by a polar adjacent angle which is measured parallel with the XY plane, such as polar adjacent angle 515 (FIG. 5(a)) separating polar cameras 510 and 520. In most embodiments of the present invention, the polar cameras of the first plurality of cameras are distributed evenly, thus the polar adjacent angles are all approximately equal to 360 degrees divided by the number of polar cameras in the first plurality of polar cameras. Thus, for example in a specific embodiment of camera system 400, cameras 510, 520, and 530 all have polar adjacent angles equal to approximately 120 degrees. The number of polar cameras required for full environment coverage is dependent on the vertical field of view equatorial camera and horizontal field of view in the polar cameras. Specifically, a practical estimate of the number of polar cameras required for full environment coverage is an integer value greater than or equal to 360 degrees multiplied by the cosine of half the vertical field of view of the equatorial camera divided by the horizontal field of view of the polar camera.

Figure 5D:
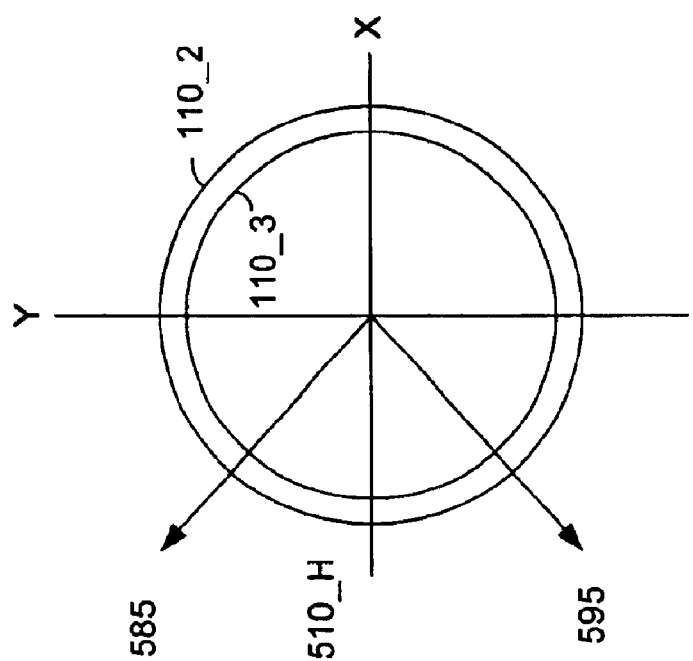
FIG. 5(d) is a conceptual diagram illustrating fields of view for a cameras system an accordance with one embodiment of the invention.
Figure 5C:
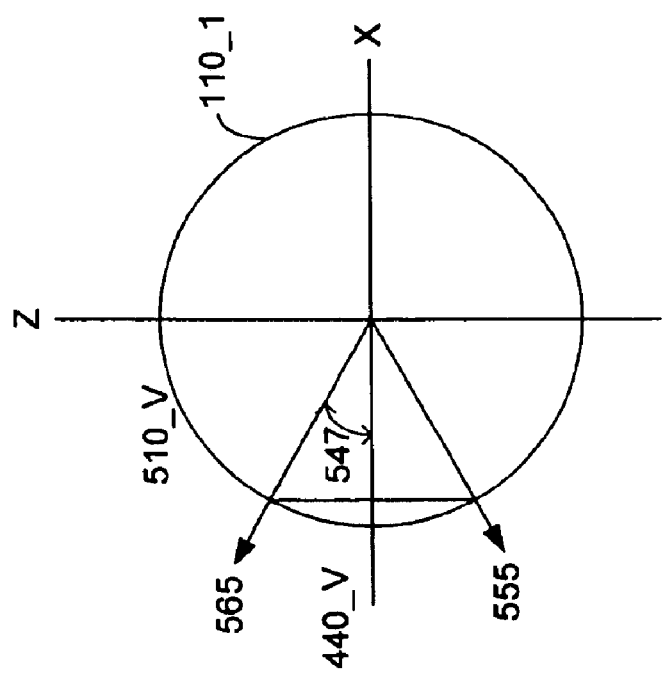
FIG. 5(c) is a conceptual diagram illustrating fields of view for a cameras system an accordance with one embodiment of the invention.

The derivation of the number of polar cameras is conceptually explained with reference to FIGS. 5(c) and 5(d). As with the derivation of equatorial offset angle, the following explanation is based on rectangular projections of the field of view of the various equatorial and polar cameras. In actual use, the rectangular projections do not produce rectangular fields of view on sphere 110. Thus, many small inaccuracies exist in the following calculations of the number of polar cameras required for complete coverage. However, as long as the estimated number is not very close to the next greater integer these small inaccuracies can be ignored. For clarity, camera system 400 is not shown in FIGS. 5(c) and 5(d). FIG. 5(c) is a view of the XZ plane from the perspective of looking down the Y axis with the negative Y axis coming out of the page. The intersection of sphere 110 with the XZ plane is shown as circle 110_1 in FIG. 5(c). Vertical field of view 440_V is marked by rays 565 and 555. As explained above, vertical field of view 510_V of polar camera 510 must overlap vertical field of view 440_V. For clarity overlapping portions of vertical fields of view 440_V and 510_V are omitted in FIG. 5(c). FIG. 5(d), which is drawn from the perspective looking down from the Z axis with the positive Z axis coming out of the page, shows a circle 110_2 which corresponds to intersection of sphere 110 with the XY plane. FIG. 5(d) also shows a circle 110_3 which corresponds to the intersection of sphere 110 with a plane containing the intersection of ray 565 with sphere 110 and parallel to the XY plane. Horizontal field of view 510_H is marked by rays 585 and 595. The radius of circle 110_3 is smaller than the radius of circle 110_2, which is defined to be equal to one. Specifically, the radius of circuit 110_3 is equal to the cosine of angle 547 (FIG. 5(c)). Angle 547 is equivalent to half of vertical field of view 440_V of equatorial camera 440. Although angular field of view has been used above to determine the number of equatorial cameras, angular field of view is actually a proxy for arc length coverage. However, because sphere 110 is defined to have a radius of one, arc length and angular field of view are equivalent measures for equatorial cameras. However, for polar cameras the actual radius of the sphere for horizontal field of view is less than one. Thus, the angular horizontal field of view is not a direct proxy for arc length. Therefore, the horizontal field of view of polar cameras must be divided by the radius of sphere 110_3, i.e. the cosine of half of vertical field of view 440_V. Thus, for an embodiment of camera system 400 using both equatorial cameras and polar cameras having a vertical field of view of approximately 76 degrees and a horizontal field of view of approximately 104 degrees, the number of polar cameras necessary for complete environment coverage is an integer greater than or equal to 360 multiplied by cosine of 38 degrees divided by 104 degrees (i.e. 360*COS(38)/104 equals approximately 2.737). Therefore, in this embodiment three polar cameras are used in the first plurality of polar cameras.

Figure 6B:
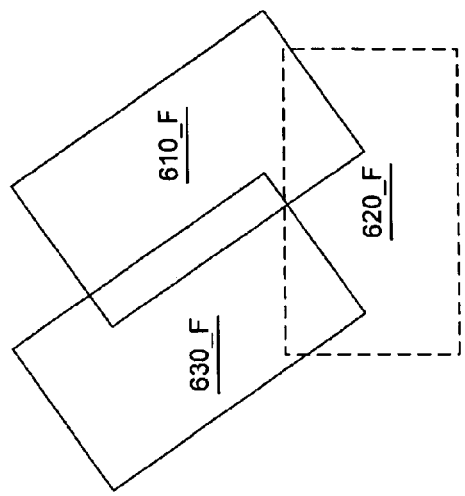
FIGS. 6(a)–6(c) are conceptual diagrams of fields of view to illustrate some benefits of rotated fields of view.
Figure 6A:
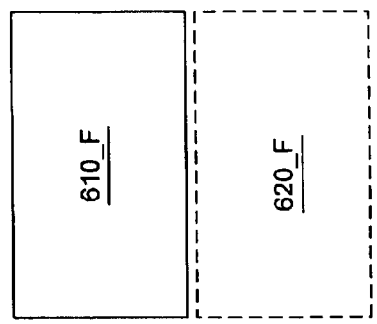
Figure 6C:
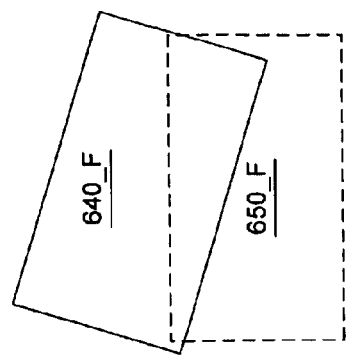

As explained above, the derivation of equatorial offset angles and the estimated number of polar cameras assumed that the fields of view of the equatorial and polar cameras are aligned with the XY plane. However, some embodiments the present invention includes cameras that are rotated along the optical axis of the camera. Rotation along the optical axis in many cases may allow complete coverage in situations where having all fields of view aligned with the XY axis may fail to provide complete coverage. FIGS. 6(a)–6(c) illustrates some benefits that may be obtained from rotation of the field of view. For clarity, FIGS. 6(a)–6(c) use rectangular projection; however, as explained above in actual use, the rectangular projections do not produce rectangular fields of view on sphere 110. However, the inaccuracies introduced by this simplification do the greatly diminish benefits being illustrated. Specifically, in FIG. 6(a) a field of view 610_F and a non overlapping field of view 620_F are shown. However, as illustrated in FIG. 6(b), by rotating field of view 610_F, field of view 610_F can be made to overlap field of view 620_F. Additional rotated fields of view such as field of view 640_F can also be used for complete coverage of the environment. FIG. 6(c) shows a rotated field of view 640_F with a field of view 650_F. By rotating field of view 640_F, the effective horizontal field of view for field of view 640_F is increased. The increase of increased effective horizontal field of view is illustrated by field of view 640_F fully encompassing the top side of field of view 650_F. In general, the use of rotated field of views provide a mixture of benefits and additional complications. The use of rotated field of views can be greatly simplified by using a 3-D projection system such as Powerstitch™ to insure complete coverage of the environment.

Figure 7:
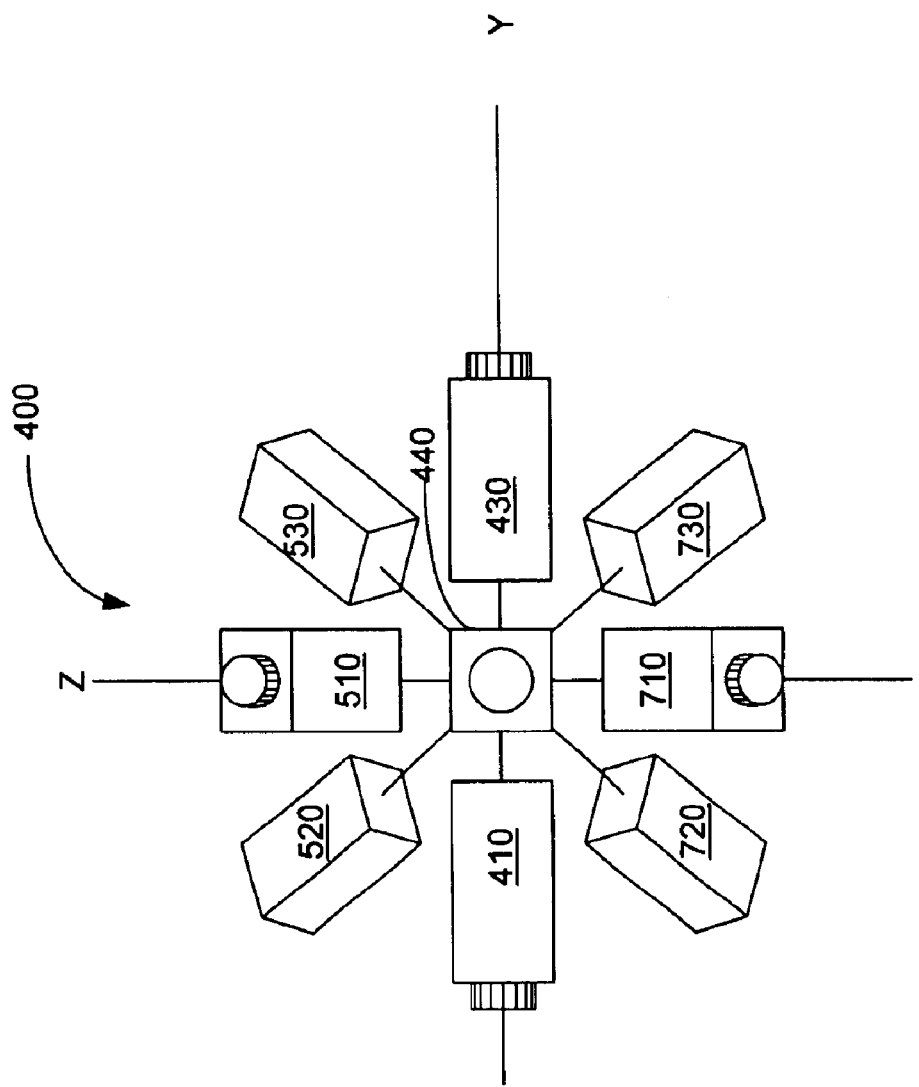
FIG. 7 is a three-dimensional diagram of an asymmetrical camera system in accordance with one embodiment of the present invention.

As illustrated in FIG. 7, camera system 400 also includes a second plurality of polar cameras. Specifically, the second plurality of polar cameras includes polar cameras 710, 720 and 730 FIG. 7 is drawn from the perspective of looking down the X axis with the negative X axis coming out of the page. Polar cameras 710, 720, and 730 face radially outward and are tilted below the XY plane by a equatorial offset angle. The equatorial offset angle is dependent on the vertical field of view the equatorial cameras and the polar cameras. Although, camera system 400 includes three polar cameras in both the first plurality and the second plurality of polar cameras, other embodiments of the present invention may include differing numbers of polar cameras in the first plurality and the second plurality of polar cameras. Furthermore, some embodiments of the present invention may include a single polar camera below the XY plane.

In the above-described manner, efficient outward facing camera systems are made possible. Specifically, an outward facing camera system in accordance with embodiments of the present invention has better utilization of the image data from each of the cameras than convention camera systems. Thus, a camera system in accordance with the present invention can use a fewer number of cameras and still provide higher resolution environment maps than conventional camera systems. The various embodiments of the structures and methods of this invention that are described above are illustrative only of the principles of this invention and are not intended to limit the scope of the invention to the particular embodiments described. For example, in view of this disclosure, those skilled in the-art can define other equatorial cameras, polar cameras, equatorial offset angles, equatorial adjacent angles, equatorial tilt angles, polar adjacent angles, vertical fields of view, horizontal fields of view, and so forth, and use these alternative features to create a method or system according to the principles of this invention. Thus, the invention is limited only by the following claims.

What is claimed is:

1. An outward facing camera system comprising:
   a plurality of equatorial cameras distributed evenly about an origin in a plane; and
   a plurality of polar cameras coupled to the equatorial cameras and tilted above the plane, wherein each of the polar cameras is tilted out of the plane by an equatorial offset angle and wherein the equatorial offset angle is in the range of 52 to 76 degrees inclusive.

2. The outward facing camera system of claim 1 wherein the equatorial cameras face radially outwards from the origin.

3. The outward facing camera system of claim 1 wherein the polar cameras face radially outwards from the origin.

4. The outward facing camera system of claim 1 wherein a first equatorial camera is offset approximately 90 degrees from a second equatorial camera.

5. The outward facing camera system of claim 1 wherein each equatorial camera is offset from an adjacent equatorial camera by the same equatorial adjacent angle.

6. The outward facing camera system of claim 1 wherein each of the equatorial cameras and each of the polar cameras is a video camera.

7. The outward facing camera system of claim 1 further comprising a polar camera coupled to the equatorial cameras and tilted below the plane.

8. The outward facing camera system of claim 7, wherein the polar camera is perpendicular to the plane.

9. The outward facing camera system of claim 1 further comprising a second plurality of polar cameras coupled to the equatorial cameras and tilted below the plane.

10. A outward facing camera system comprising:
    a first camera;
    a second camera coupled to and adjacent to the first camera, wherein the first camera and the second camera are offset by a first offset angle; and
    a third camera coupled to and adjacent to the first camera, wherein the first camera and the third camera are offset by a second offset angle differing from the first offset angle, wherein second offset angle is in the range of 52 to 76 degrees inclusive.

11. A outward facing camera system comprising:
    a first camera;
    a second camera coupled to and adjacent to the first camera, wherein the first camera and the second camera are offset by a first offset angle; and
    a third camera coupled to and adjacent to the first camera, wherein the first camera and the third camera are offset by a second offset angle differing from the first offset angle; and
    a fourth cameras coupled to and adjacent to the third camera; wherein the third camera and the fourth camera are offset by a third offset angle.

12. The outward facing camera system of claim 11, wherein the third offset angle is approximately 120 degrees.

13. The outward facing camera system of claim 1, wherein a polar camera has a vertical field of view which overlaps a vertical field of view of an equatorial camera.

14. The outward facing camera system of claim 1, wherein a vertical field of view of a polar camera is equal to the vertical field of view of a equatorial camera.

15. The outward facing camera system of claim 1, wherein a horizontal field of view of a polar camera is equal to the horizontal field of view of a equatorial camera.

* * * * *